US005734696A

United States Patent [19]
Day

[11] Patent Number: 5,734,696
[45] Date of Patent: Mar. 31, 1998

[54] TESTING TELECOMMUNICATIONS EQUIPMENT

[75] Inventor: Nigel Stephen Day, Suffolk, United Kingdom

[73] Assignee: British Telecommunication public limited company, London, England

[21] Appl. No.: 586,730

[22] PCT Filed: Jul. 19, 1994

[86] PCT No.: PCT/GB94/01557

§ 371 Date: Feb. 20, 1996

§ 102(e) Date: Feb. 20, 1996

[87] PCT Pub. No.: WO95/03662

PCT Pub. Date: Feb. 2, 1995

[30] Foreign Application Priority Data

Jul. 23, 1993 [GB] United Kingdom ............... 9315353

[51] Int. Cl.$^6$ .................. H04M 3/08; H04M 3/22; H04M 1/24

[52] U.S. Cl. .................. 379/15; 379/13; 455/51.1

[58] Field of Search .................. 379/2, 5, 9, 6, 379/10, 13, 15, 22, 27, 29; 455/13.2, 51.1, 51.2

[56] References Cited

U.S. PATENT DOCUMENTS

| 4,001,559 | 1/1977 | Osborne et al. |
| 4,839,916 | 6/1989 | Fields et al. |
| 4,910,760 | 3/1990 | Reformato ............... 379/13 |
| 4,937,850 | 6/1990 | Borbas et al. |
| 5,276,727 | 1/1994 | Kim et al. ............... 379/29 |
| 5,282,062 | 1/1994 | Lo Galbo et al. ............... 455/51.2 |
| 5,335,357 | 8/1994 | Fennell et al. ............... 455/51.2 |
| 5,359,646 | 10/1994 | Johnson et al. ............... 379/29 |
| 5,452,339 | 9/1995 | Siu et al. ............... 379/29 |
| 5,495,516 | 2/1996 | Lee et al. ............... 379/29 |
| 5,504,753 | 4/1996 | Renger et al. ............... 379/29 |

OTHER PUBLICATIONS

Nilsen, "Measuring Network Performance with Automatic Test Calls", 1980 IEEE International Conference on Communications, Bostoniccc/89, pp. 385–389.

Dietschi et al, "Network Quality Tester", 1225 Electrical Communication, vol. 58, (1993), No. 2, Heidenheim, Deutcshland, pp. 162–168.

Patent Abstracts of Japan, vol. 12, No. 13, (E–573), 1988, "Automatic Testing Device For Charge Band",Publication No. JP62171360.

Patent Abstracts of Japan, vol. 10, No. 283 (E–440) (2339), Sep. 26, 1986, Publication No. 61-101157.

*Primary Examiner*—Curtis Kuntz
*Assistant Examiner*—Pal Loomis
*Attorney, Agent, or Firm*—Nixon & Vanderhye P.C.

[57] ABSTRACT

A system for testing telecommunications equipment located at two sites includes a set of test instruments located at each site, a local test controller located at each site for controlling the test instrument at that site, and a master test controller connected to the local test controller by data links. Each test controller is provided with a clock and the clocks are synchronized by a common timing signal. The master test controller is arranged to transmit test instructions to, and receive test results from, the local test controllers.

6 Claims, 5 Drawing Sheets

TESTING TELECOMMUNICATIONS EQUIPMENT

BACKGROUND OF THE INVENTION

1. Field of the Invention

This invention relates to a system for, and a method of, testing telecommunications equipment.

2. Related Art

In U.S. Pat. No. 4,910,760, there is described a system for testing telecommunications equipment comprising a local test controller for controlling test instruments and a master test controller for controlling the local test controller. Similar systems are described in U.S. Pat. No. 4,937,850 and U.S. Pat. No. 4,001,559. Where a master test controller controls one or more local test controllers, it has been found that some tests require synchronisation between the test controllers. However, this problem is neither identified nor solved in any of these three prior art documents.

SUMMARY OF THE INVENTION

According to this invention, there is provided a system for testing telecommunications equipment, said system comprising a master test controller, at least one local test controller, a test instrument associated with the or each local test controller and arranged to be controlled thereby, and means for transmitting data between the master test controller and the or each local test controller, said data being test instructions transmitted by the master test controller to the or each local test controller and test results received by the master test controller from the or each local test controller, each test controller being provided with a clock having an antenna for receiving a common radio timing signal.

By providing a clock having an antenna for receiving a common radio timing signal for each test controller, the operation of the test controllers may be accurately synchronised.

BRIEF DESCRIPTION OF THE DRAWINGS

This invention will now he described in more detail, by way of example, with reference to the drawings in which.

DETAILED DESCRIPTION OF EXEMPLARY EMBODIMENTS

Figure 1:
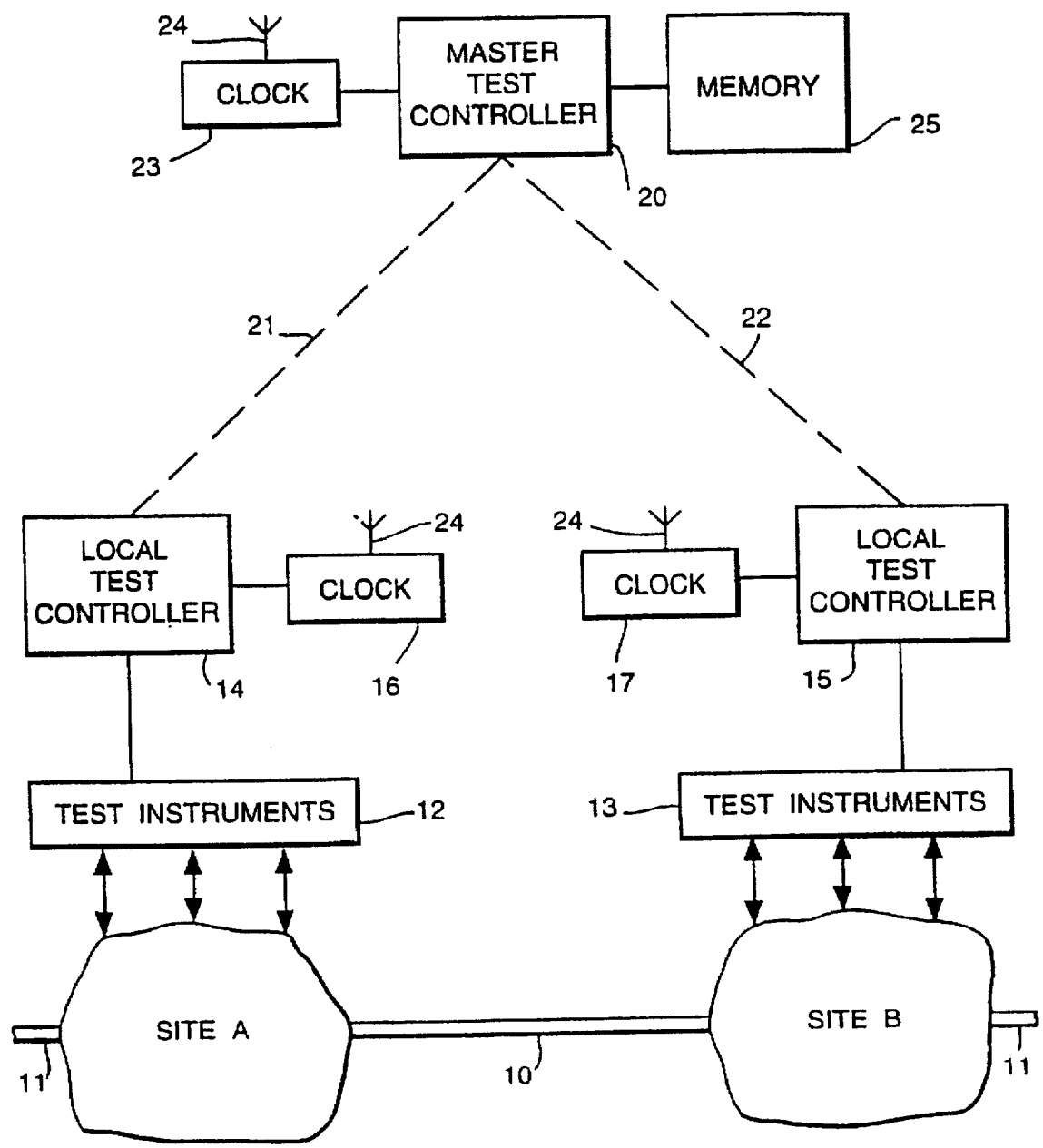
FIG. 1 is a block diagram of a first system for testing telecommunications equipment embodying this invention.

The drawing of FIG. 1 shows two sites, namely site A and site B, at which telecommunications equipment is located. The equipment located at each site may comprise, for example, a switch, one or more multiplexers, a computer for operating the switch and equipment for providing information which may be used for charging purposes. The two sites are connected by a traffic carrier 10 and the sites are connected to further sites, not shown, by further traffic carriers 11. The traffic carriers 10, 11 may be, for example, optical fibres or microwave links.

Sites A and B are provided, respectively, with a set of test instruments 12, 13. Each test instrument is arranged to make tests at one or more points in the equipment located at its site. Sites A and B are also provided, respectively, with local test controllers 14, 15 each of which is arranged to control the test instruments 12, 13 located at its site. The local test controllers 14, 15 are provided with clocks 16, 17.

The system also includes a master test controller 20 which may be located at one of the sites A or B or at another convenient location. Data may be transmitted between the master test controller 20 and the local test controllers 14, 15 through data links 21, 22. By way of example, the links 21, 22 may be dedicated traffic carriers or may form part of a public telecommunications network. The master test controller 20 is provided with a clock 23.

Each of the clocks 16, 17 and 23 is provided with an antenna 24 for receiving a common timing signal in the form of the International Time Standard. The International Time Standard is transmitted worldwide from the Internal Time Bureau in Paris via satellite. Thus, the International Time Standard is used to synchronise the clocks 16, 17 and 23. Other time sources, for example, a portable clock or off-air receivers may be used.

Each of the clocks 16, 17 and 23 is a type RCC8000 clock manufactured by Radiocode (UK) Ltd, of Radiocode House, Jennings Road, Penryn, Cornwall, England.

The master test controller 20 has a memory 25 which contains it operating program. The operating program includes a module for instructing the local test controllers 14, 15 to initialise the test instruments 12, 13, modules for instructing the local test controllers 14, 15 to perform various tests, modules for logging the results of the tests, and modules for correlating, filtering and analyzing the results.

The test system may be used to perform a wide range of tests. For example, it may be used to monitor the integrity and speed with which messages are transmitted from site A to site B. In order to achieve this, the master test controller 20 instructs the local test controller 14 to instruct an appropriate one of test instruments 12 to transmit defined message at preset times to site B. It also instructs the local zest controller 15 to instruct an appropriate one of test instruments 13 to monitor the integrity with which each message is received and the time of its receipt. The local test controller 15 is also instructed to send the results back to the master test controller 20. The master test controller 20 logs and analyzes the results. Thus, the integrity of transmission of a large number of messages may be tested. Also, because the clocks 16, 17 and 23 are synchronised, the transmission period for each message may be determined accurately. The remote test instruments may also be operated interactively via the master test controller 20.

Other uses of the test system shown in FIG. 1 include testing the accuracy with which messages are routed, performance measurements, testing the integrity of new equipment in a telecommunications network and the accuracy and operation of charging equipment. The operating program for the master test controller 20 is arranged to present the analysis of the results in a form which may be easily and rapidly understood by its human operator. Because the test system performs and analyzes tests automatically, results are achieved quickly and with minimum expenditure of time by its operator.

Although not shown in FIG. 1, the test system could be expanded so that the master controller 10 controls local test controllers, and hence test instruments, at more than two sites. Also, the local test controllers and test instruments controlled by them can be moved from site to site, as required, while the master zest controller remains at the same site.

Figure 2:
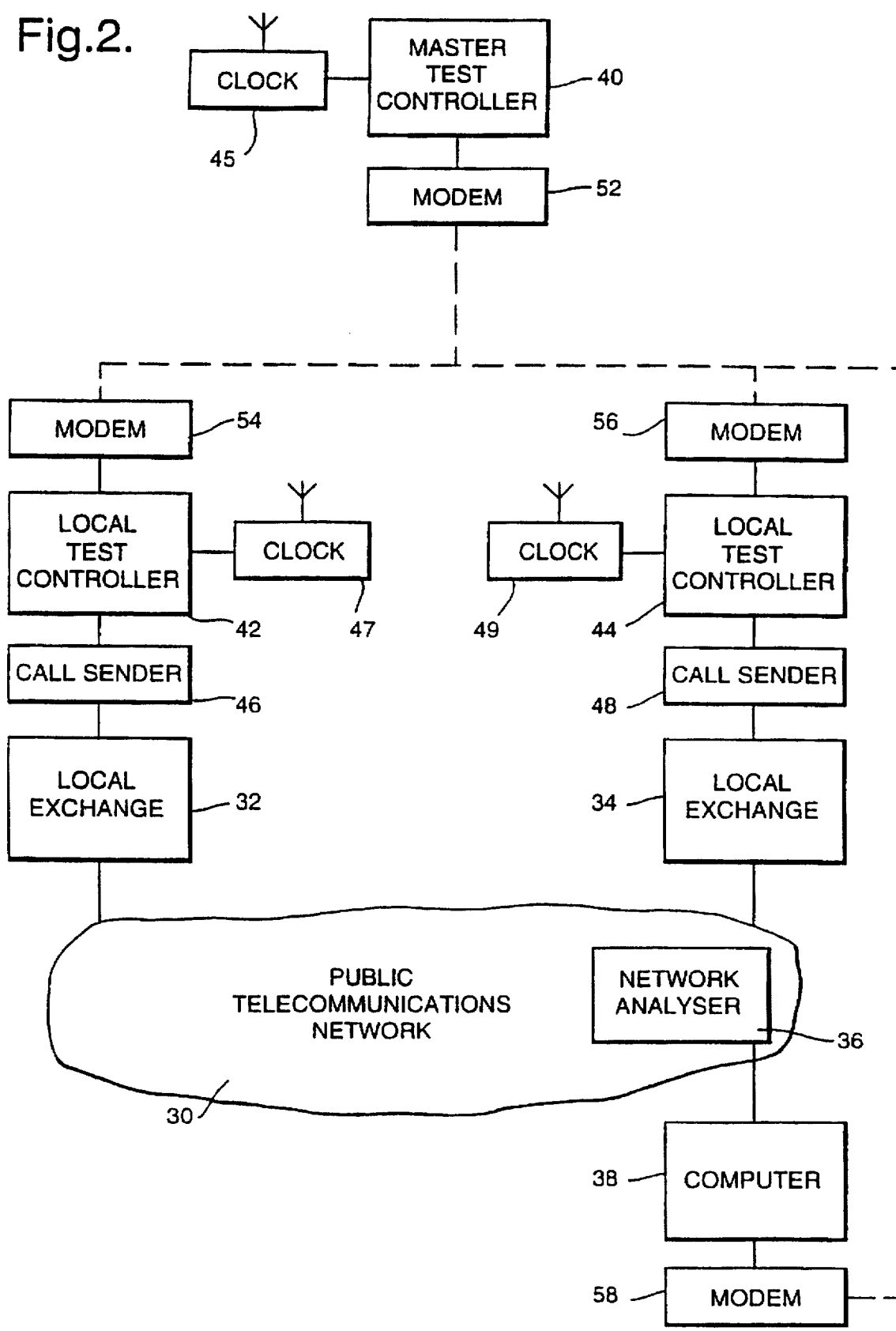
FIG. 2 is a block diagram of a second system for testing telecommunications equipment embodying this invention.

Referring now to FIG. 2, there is shown a test system for testing the accuracy of charging equipment located at a local exchange forming part of a public switched telecommunications network.

In FIG. 2, the public telecommunications network is indicated generally at 20. The public telecommunications network 30 is of generally conventional construction and comprises a set of interconnected trunk exchanges, each of which is connected to one or more local exchanges which in turn are connected to customers' equipment. The local and trunk exchanges may be, for example, System X exchanges manufactured by GEC Plessey Telecommunications. The public telecommunications network 30 can support both voice and ISDN calls. FIG. 2 shows two of the local exchanges and these are indicated by reference numerals 32, 34.

The public telecommunications network 30 includes a network analyzer 36 which is operated by a computer 38.

The test system comprises a master test controller 40, and two local test controllers 42, 44, which are located, respectively, at local exchanges 32, 34. The master test controller 40 and the local test controllers 42 and 44 are each implemented as a computer and these test controllers are generally similar to those shown in FIG. 1. The test controllers 40, 42 and 44 are provided with clocks 45, 47 and 49, which are similar to the clocks 16, 17 and 23 in FIG. 1.

In the present example, the master test controller 40 is located at a site which is remote from local exchanges 32 and 34. In order to pass data, including test instructions and test results, between the master test controller 40 and the local test controllers 42 and 44, these test controllers are provided with modems 52, 54 and 56. Data is transmitted between modem 52 and modems 54 and 56 over an RS232 connection which, conveniently, may be made through a public telecommunications network.

The local test controllers 42, 44 control, respectively, call senders 46 and 48. The call senders 46, 48 are connected, respectively, to the local exchanges 32, 34. Each call sender 46, 48 can make and receive calls via its local exchange. Thus, the call sender 46 can make a call via local exchange 12 to a destination number connected to another local exchange or to a destination number served by local exchange 32. If desired, the call sender 46 can send a call to itself via local exchange 32, using one exchange line as the outgoing line and another line as the incoming line. The call sender 48 has similar capabilities. Each of the call senders 46, 48 is a call sender manufactured by Rotadata Limited of Bateman Street, Derby, England and sold under The product name KESTREL.

The computer 38 is provided with a modem 58 for transmitting data, using an RS232 connection, to modem 52, which in turn transmits the data to the master test controller 40.

Each of the local exchanges 32, 34 is provided with equipment for providing charging data relating to each call made by the customers of that exchange. Each of the local test controllers 42, 44 has access to this charging data and can transmit it, on a selective basis, to the master test controller 40.

In order to test the accuracy of the charging equipment located at local exchange 22, the master test controller 40 instructs the local test controller 42 to cause the call sender 46 to make a series of calls at preset times and having preset durations to call sender 48. It also instructs the local test controller 44 to cause the call sender 48 to monitor each of these calls. The local test controllers 42, 44 send the results of the calls to the master test controller 40 and, in addition, the local test controller 42 sends the charging data for each call to the master test controller 40. The master test controller 40 then analyzes the results on a call-by-call basis. For each call, it specifically checks that the results from the local test controller 42 show that the call was made at the preset time with the preset duration, that it was received by the call sender 48 at the preset time and for the preset duration, and that the charging data for that call retrieved from the charging equipment for Local exchange 32 has accurately recorded the charge for the call. In the analysis, the maser test controller 40 records any differences between the results from local test controller 42 and the results from local test controller 44 and any difference between the charge for the call as calculated from the results from local test controller 42 for that call and from the data retrieved from the charging equipment.

The network analyzer 36 provides data on each call relating to its set up. Where the results from local test controller 42 and 44 differ for a particular call, the reason for this may be apparent from the data obtained from network analyzer 35.

Figure 3:
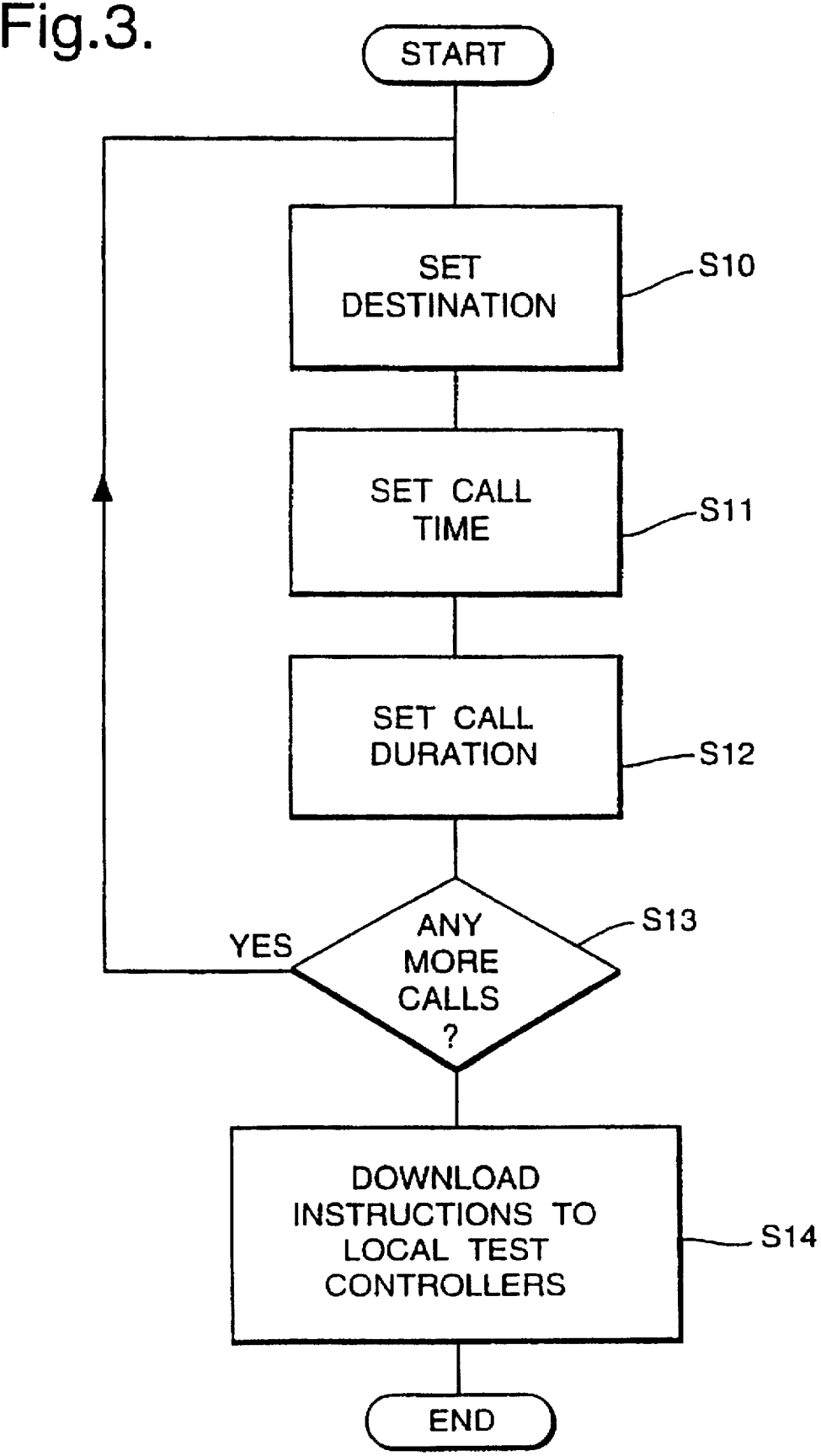
FIG. 3 is a flow chart of a program used in the master test controller of the system of FIG. 2.

Referring now to FIG. 3, there is shown the routine used by master test controller 40 for establishing a series of calls. After entering this routine, in a step S10, the master controller 40 asks the operator for the destination number for a call. This number is entered by the operator. Next, in a step S11, the master test controller 40 asks the operator for the preset time for the call and the operator enters this data. Then, in a step S12, the master test controller 40 asks the operator for the duration of the call and the operator enters this data.

In a step S13, the master test controller 40 asks the operator if he wishes to establish any further calls. If the operator does wish to establish a further call, the routine returns to S10. If the operator does not wish to establish any further calls, the routine continues with a step S14. In this step, the master test controller downloads instructions to the local test controller 42 to make the calls and instructions to the local test controller 44 to check that the calls are received.

Although in the example given above, the test system is used to test the accuracy of the charging equipment located at local exchange 32, it is to be appreciated that it can also be used to check the charging equipment located at local exchange 34. In this case, the master controller 40 instructs the local test controller 44 to make the calls and the local test controller 42 to test the results of the calls. If it is desired to test the accuracy of charging equipment located at other exchanges, this may be achieved by moving one of the local test controllers 42, 44 together with its call sender and modem to that exchange. Alternatively, the other exchange may be provided with its own dedicated call sender and local test controller.

Figure 4:
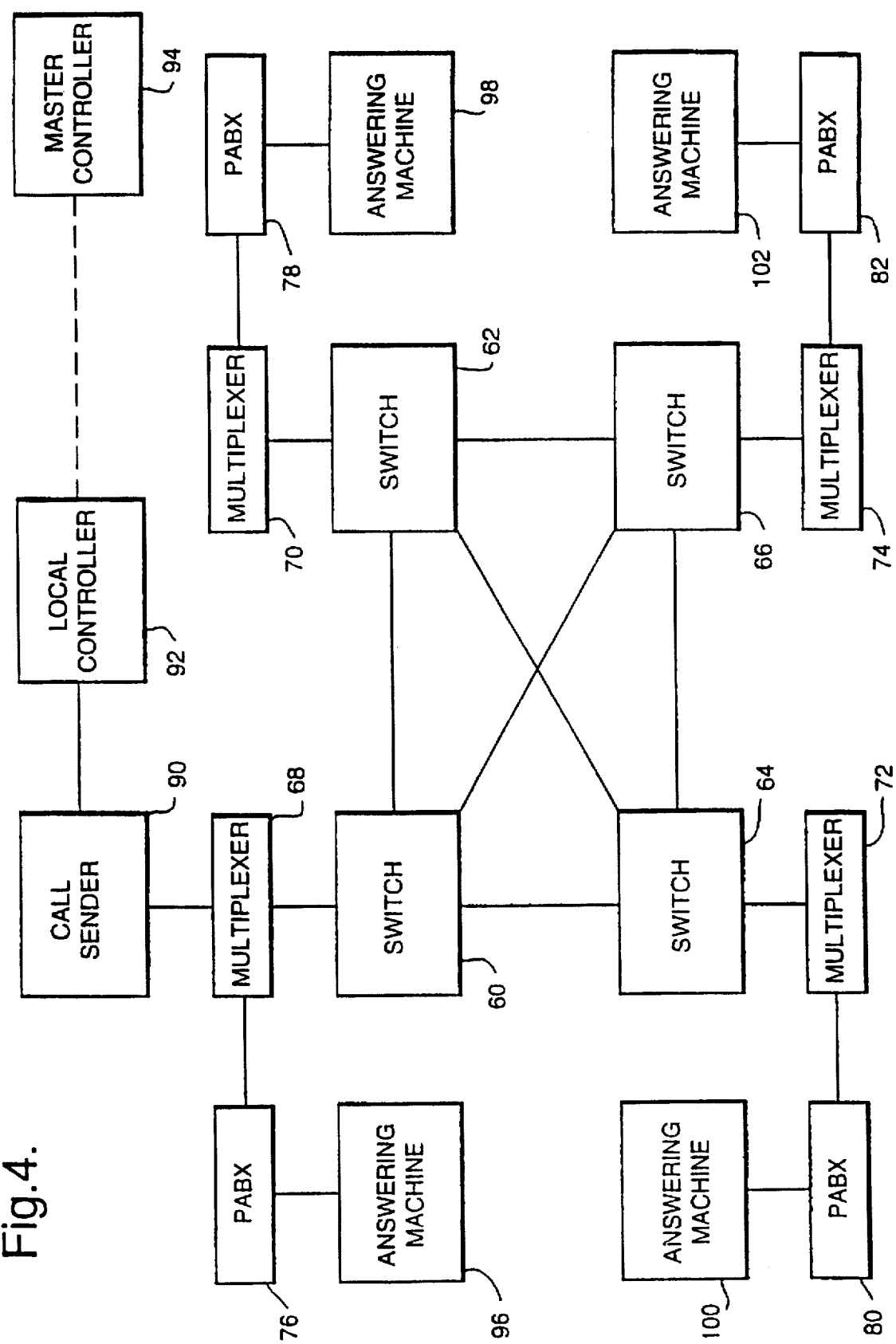
FIG. 4 is a block diagram of a third system for testing telecommunications equipment embodying this invention.

Referring now to FIG. 4, there is shown another test system for testing a telecommunications network. The telecommunications network shown in FIG. 4 comprises four fully interconnected switches 60, 62, 64 and 66. Each of the switch 60, 62, 64, 66 is a switch of the type known as a service switching point and, in the present example, each of these switches in an AXE10 switch manufactured by Ericcson Telecommunications. The switches 60, 62, 64, 66 have access to a service control point, not shown, which contains data, such as number translation data, to support the services provided by the telecommunications network.

The switches 60, 62, 64, 66 are connected, respectively to multiplexers 68, 70, 72, 74. By way of modification each switch may be connected to more than one multiplexer. The multiplexers 68, 70, 72, 74 are connected to private automatic branch exchanges (PABX) belonging to the customers of the network. For reasons of simplicity, only four PABXs are shown in FIG. 4 and these are denoted by reference numerals 76, 78, 80, 82.

The test system comprises a call sender 90 controlled by a local test controller 92, which in turn is controlled by a master test controller 94. The call sender 90 is of the same type as call sender 76 shown in FIG. 2 and the local test controller 92 and the master test controller 94 of the same general construction as the local test controller 42 and the master test controller 40 shown in FIG. 2. Each of the test controllers 92, 94 is provided with a clock similar to the clocks 45, 47 and 49 and these two test controllers are provided with modems so that they can be connected by an RS232 connection. Alternatively, the master test controller can be located with the local test controller 92 and connected to it directly. The call sender 90 and the local test controller 92 are located at the site of multiplexer 68 and the call sender 90 is connected to the multiplexer 68 for the purpose of making and receiving calls.

The PABXs 76, 78, 80 and 82 are provided, respectively, with answering sets 96, 98, 100, 102, and each of these answering sets is manufactured by, and available from, Rotadata Limited.

In order to test the operation of the telecommunications network shown in FIG. 4, the master test controller 94 instructs the local test controller 92 to cause the call sender 90 to make a series of calls at preset times to the answering sets 96, 98, 100, 102. The local test controller 92 then returns the results of these calls to the master test controller 94. The master test controller then analyzes them in order to assess the performance of the network. If desired, the master test controller can transmit the results to a network management centre, not shown.

By way of modification, the test system may include answering machines which are connected directly to one or more of the multiplexers 68, 70, 72, 74.

Figure 5:
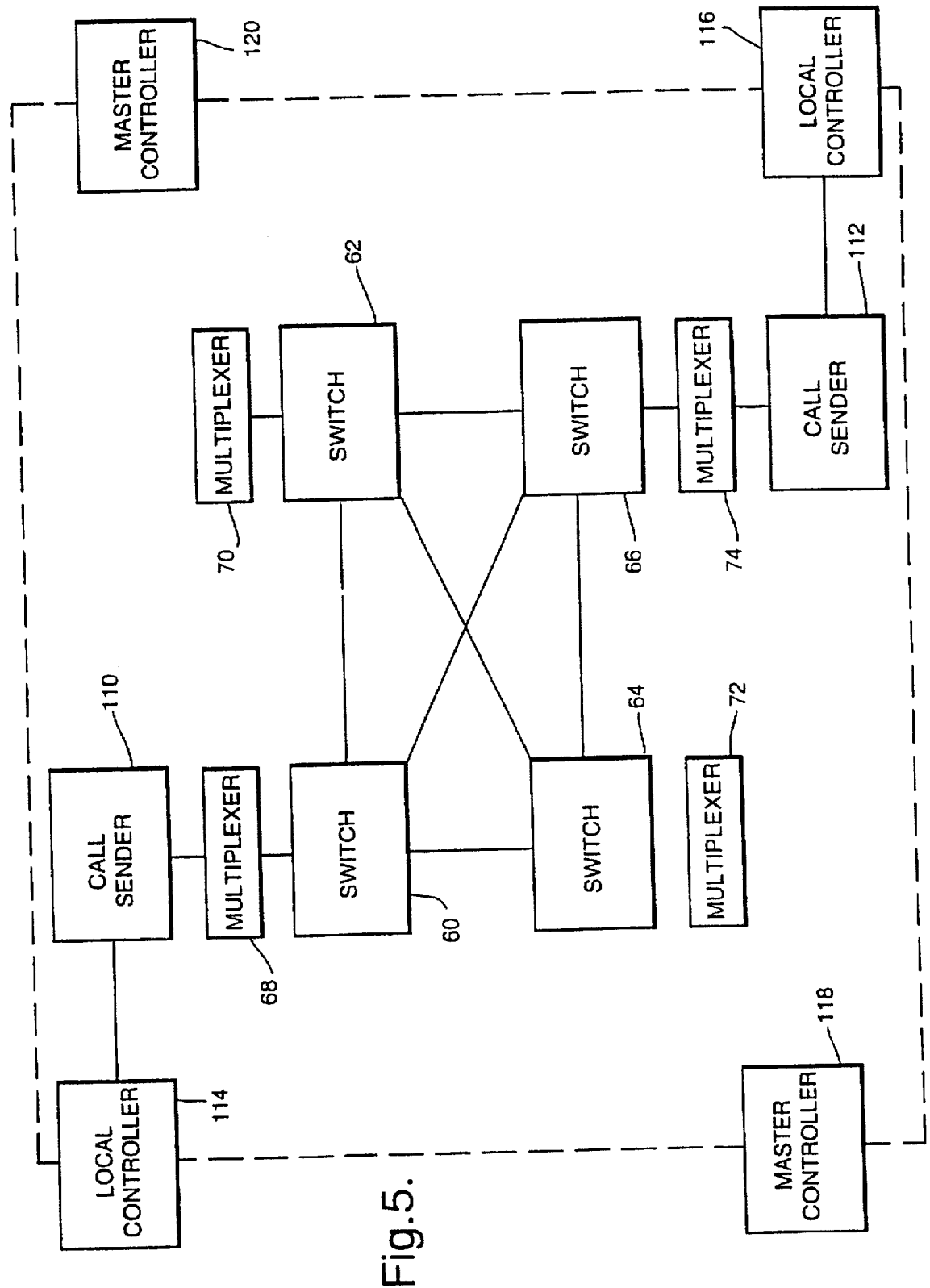
FIG. 5 is a block diagram is a fourth system for testing telecommunications equipment embodying this invention.

Referring now to FIG. 5, there is shown a modification to the test system shown in FIG. 4. In FIG. 5, the telecommunications network takes the same general form as shown in FIG. 4 and like parts are being denoted by the same reference numerals. Although not shown in FIG. 4, the multiplexers 68, 70, 72 and 74 are connected to PABXs.

The test system comprises two call senders 110, 112, which are controlled, respectively, by local test controller 114, 116. The test system also includes two master test controllers 118, 120. Although not shown, the test system also includes answering machines which are connected either to PABXs or directly to the multiplexers. The call senders 110, 112 are of the same type as the call senders 46 shown in FIG. 2, the local test controllers 114, 116 are of the same general form as the local test controller 42 shown in FIG. 2, and the master test controllers 118, 120 are of the same form as the master test controller 40 shown in FIG. 2. Although not shown the test controllers are provided with clocks similar to the clock 47 shown in FIG. 2.

The call sender 110 and the local test controller 114 are located at the same site as multiplexer 68 and the call sender 110 is connected to this multiplexer 68 for making and receiving calls. Similarly, the call sender 112 and the local test controller 116 are located at the site of multiplexer 74 and the call sender 112 is connected to multiplexer 74 for the purpose of making and receiving calls. The test controllers are provided with modems and both local test controllers 114, 118 can communicate with both master test controllers 118, 120 via an RS232 connection. The master test controllers 118, 120 are located remotely from each other.

In order to test the network, either of the master test controllers 118, 120 can send instructions to the local test controllers 114, 116. These instructions may take the form of instructing one of the local test controllers to cause its call sender to make a series of calls to answering machines. Alternatively, the instructions may take the form of instructing one of the local test controllers to cause its call sender to make calls to the call sender controlled by the other local test controller.

The test system of FIG. 5 provides the advantage that an operator can test the network either from the location of master test controller 118 or the location of master test controller 120.

I claim:

1. A system for testing telecommunications equipment, said system comprising:

a master test controller, at least two local test controllers, a test instrument associated with each local test controller and arranged to be controlled thereby, and means for transmitting data between the master test controller and each local test controller, said data being test instructions transmitted by the master test controller to each local test controller and test results received by the master test controller from each local test controller, each test controller being provided with a clock having an antenna for receiving a common radio timing signal, a second master test controller, and second means for transmitting data between the second master test controller and each local test controller said data being test instructions transmitted by the second master test controller to each local test controller and test results received by the second master test controller from each local test controller.

2. A system as in claim 1 wherein one of the test instruments is a call sender.

3. A system as in claim 2, wherein the system further includes an answering machine located remotely from the call sender.

4. A method for testing telecommunications equipment, said method comprising:

providing a master test controller, providing at least two local test controllers, providing a test instrument associated with each local test controller and arranged to be controlled thereby, and transmitting data between the master test controller and each local test controller, said data being test instructions transmitted by the master test controller to each local test controller and test results received by the master test controller from each local test controller, each test controller being provided with a clock having an antenna for receiving a common radio timing signal, providing a second master test controller, and transmitting data between the second master test controller and each local test controller, said data being test instructions transmitted by the second master test controller to each local test controller and test results received by the second master test controller from each local test controller.

5. A method as in claim 4 wherein one of the test instruments is a call sender.

6. A method as in claim 5 wherein the system further includes an answering machine located remotely from the call sender.

* * * * *